Sept. 23, 1930.  R. L. FREELAND  1,776,498
SEDIMENT TRAP
Filed March 25, 1929  2 Sheets-Sheet 1

INVENTOR,
R. L. Freeland,
BY
F. E. Maynard, ATTORNEY.

Sept. 23, 1930.  R. L. FREELAND  1,776,498
SEDIMENT TRAP
Filed March 25, 1929  2 Sheets-Sheet 2

INVENTOR,
R. L. Freeland;
BY
F. E. Maynard, ATTORNEY.

Patented Sept. 23, 1930

1,776,498

UNITED STATES PATENT OFFICE

ROBERT L. FREELAND, OF LOS ANGELES, CALIFORNIA

SEDIMENT TRAP

Application filed March 25, 1929. Serial No. 349,857.

This invention relates to means for the removal of liquid from its container without the disturbance and eduction of such sediment as may have accumulated from one or another cause in processing or from natural separation of the heavier constituents.

One object is to provide a sediment trap of utmost simplicity and low cost, and of substantial form and which is adaptable to be readily applied to or removed from a given container wherein the sediment is to be trapped so that the clarified liquor may be drawn off quite free from the bottom strata of the whole.

Other objects, advantages and features of construction and combination and details, and the mode of operation will be made manifest in the ensuing description of the herewith illustrative embodiment; it being understood that modifications, variations and adaptations may be resorted to within the spirit, scope and principle of the invention without departing from the claims.

The present trap and separator is shown as applied to a jar J of any desired kind containing a liquid L to be settled.

The trap consists of a shallow, inverted basin 2 of such form in plan as to closely conform to the interior wall at the bottom of the container; the rim 3 of the basin holding it up a suitable degree above the bottom of the container so as to effectually separate the sedimentary strata from the upper clear liquor L.

The trap has a vent pipe 5 which allows the basin to be lowered into the jar with but little or no disturbance of the sediment.

While the liquid may be drawn off from above the inserted trap in any suitable manner there is here shown a siphon tube T having a screened inlet which is attached to the lower part of the pipe as by means of a hook 6 secured on the pipe.

It will be seen that after the liquid has thoroughly settled in the jar the trap may be lowered to the bottom along with the attached tube T and the siphon then started to educt the clear liquor from above the trap, after which the trap can be easily removed and the jar cleaned for new use.

It is to be understood that the jar and its complementary trap may be of any suitable form in plan as this in immaterial to the effectiveness of the trap.

Figure 1:
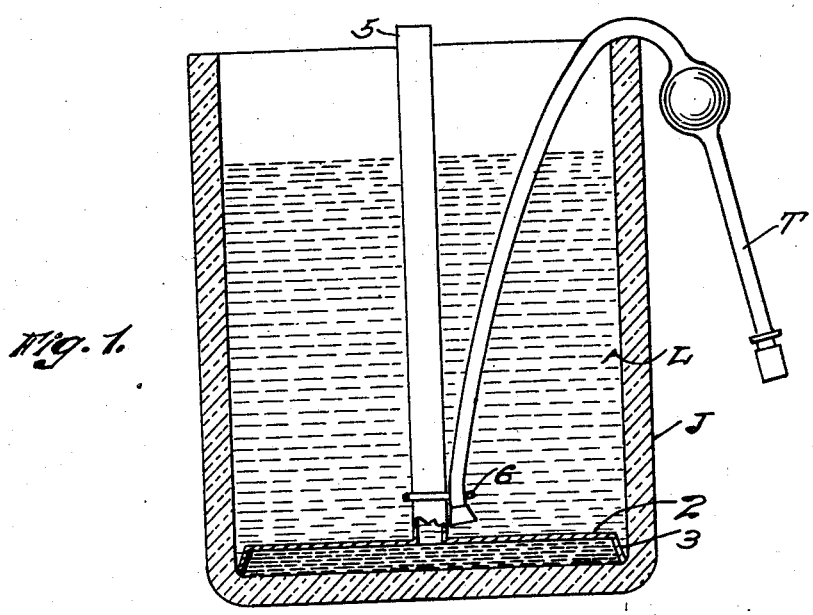
Figure 1 is a vertical section of the container and the applied trap device a syphoning means.
Figure 2:
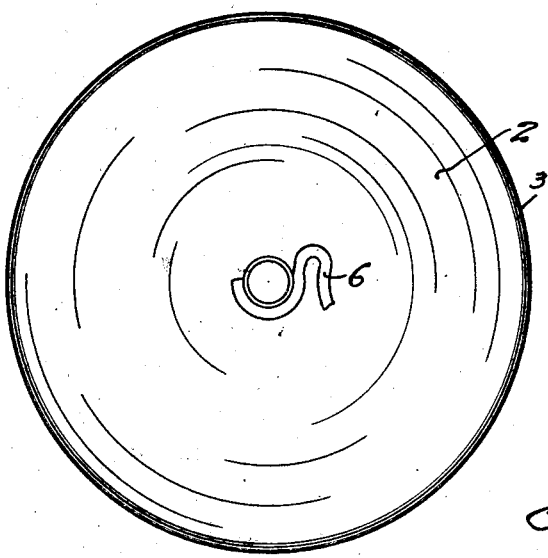
Figure 2 is a plan of the trap.
Figure 3:
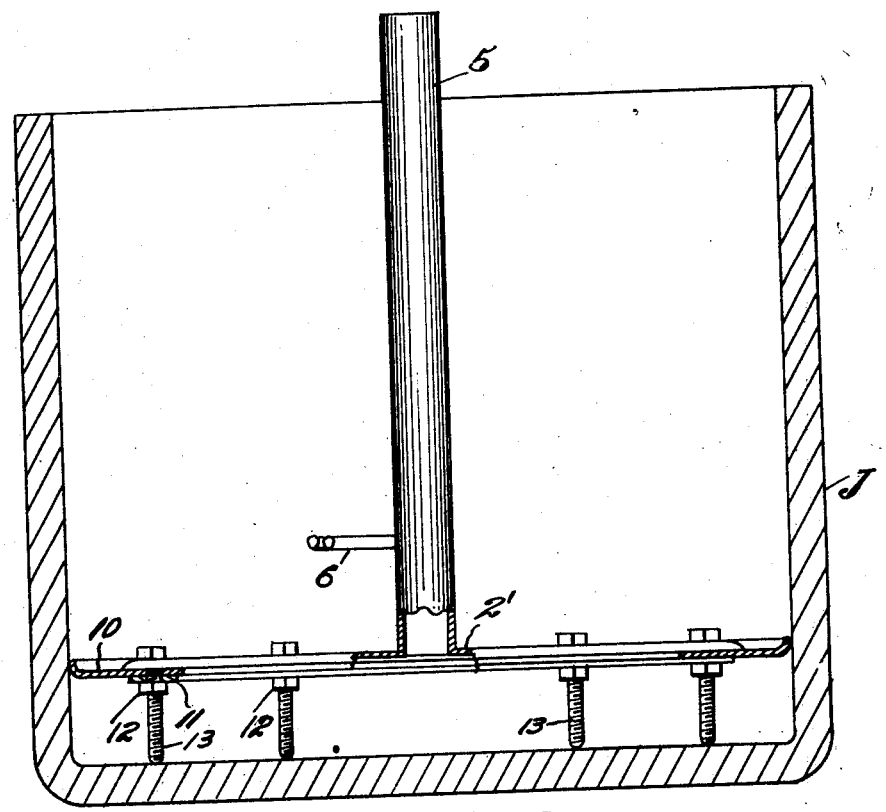
Figure 3 is a central, vertical section of a modified form of the trap.
Figure 4:
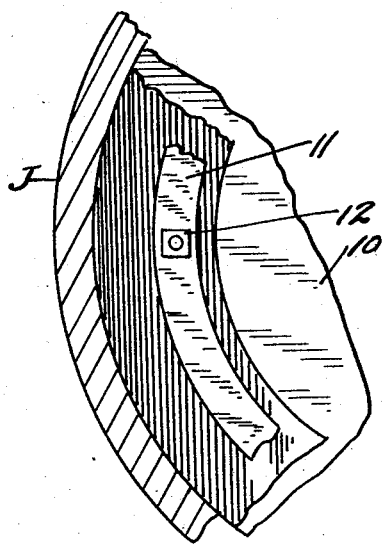
Figure 4 is bottom plan of a fragment of the packing disc thereof.

A very satisfactory form of the device is shown in Figs. 3 and 4 wherein the trap includes a flat disc 2' from which the pipe 5 extends and has a hitch 6 for the eduction tube. A flat, marginal rubber annulus 10 is pressed against the disc by a ring 11 and extends well beyond the rim so as to yieldably engage and slide down the wall of the jar with sealing effect and trap off the sediment layer. The parts are clamped by nut 12 on screw posts 13 which engage the bottom of the jar and elevate the trap a suitable distance.

What is claimed is:

1. A sediment trap applicable to a given container to form a shut off, sediment strata at the bottom thereof and including an inverted basin whose rim fits the wall at the bottom of the container, a vent pipe joined thereto and terminating at the top of the basin for rise of liquid as the trap is inserted in the container, and a siphon tube attached to the pipe just above the basin.

2. A sediment trap applicable to a given container to form a shut off sediment strata and having a vent pipe for up flow of liquor as the trap is immersed, said pipe having a siphoning device attached for drawing liquid from above the trap.

ROBERT L. FREELAND.